COMMUNICATIONS HEADSET WITH TRANSMITTER AND RECEIVER LOCATED IN A NOISE-SHIELDING CUP COVERING MOUTH

Filed Aug. 25, 1966 3 Sheets-Sheet 1

INVENTOR.
FRED P. BEGUIN

BY James P. McAndrews

ATTORNEY

INVENTOR.
FRED P. BEGUIN
BY James P. Mc Andrews
ATTORNEY

INVENTOR.
FRED P. BEGUIN
BY James P. McAndrew
ATTORNEY

United States Patent Office 3,471,642
Patented Oct. 7, 1969

3,471,642
COMMUNICATIONS HEADSET WITH TRANSMITTER AND RECEIVER LOCATED IN A NOISE-SHIELDING CUP COVERING MOUTH

Fred P. Beguin, Sturbridge, Mass., assignor, by mesne assignments, to American Optical Corporation, Southbridge, Mass., a corporation of Delaware Filed Aug. 25, 1966, Ser. No. 582,178
Int. Cl. H04m *1/05, 1/19*
U.S. Cl. 179—1 3 Claims

ABSTRACT OF THE DISCLOSURE

A communications headset having signal transmitting and receiving means disposed within a noise-shielding cup adapted to be fitted about the mouth. Elongated hollow sound channelling means provide acoustical communication between the signal receiving means and ears of a wearer when the headset is fitted about the mouth and the sound channelling means are entered into canals of the ears.

This invention relates to communication apparatus and, more particularly to a novel and improved communications headset, including signal receiving and transmitting means, which is especially adapted for intermittent use in high noise environments.

With the increasing use of helicopters in military combat operations, the need for an improved type of communication apparatus has become apparent. Helicopter crewmen must frequently communicate with nearby ground forces in high noise situations and many times are called upon to leave their aircraft to assist in ground rescue and supply operations. For these purposes, a communication headset is required which provides good communications in high noise areas, which can be conveniently worn with a military helmet, but which is easily and rapidly removed whenever necessary without requiring removal of the helmet.

It is an object of this invention to provide novel and improved communications apparatus; to provide an improved communications headset which is especially adapted for use in a high noise environment; to provide such a headset which is conveniently worn with a military helmet; to provide such a headset which is easily and rapidly removed from the head or mounted on the head without requiring removal of the military helmet; and to provide such an improved communications headset which is of rugged yet inexpensive construction.

Briefly described, the novel and improved communications apparatus provided by this invention comprises signal receiving and transmitting means, mounting means for the signal means adapted to rest against the face for disposing the signal means near the mouth, and acoustical transfer tube means extending from the signal means into the ear canals for transmitting acoustical signals from the signal means to the ears, the acoustical transfer tube means also serving to support the communications apparatus on the head.

In a preferred embodiment of this invention, the apparatus includes a noise-shielding cup having an open end and having a pair of apertures located at respective opposite sides of the cup adjacent the open cup end. A cushion is disposed around the open cup end to conform to the face of a person wearing the apparatus for acoustically sealing the cup to the face around the wearer's mouth. The apparatus further includes a signal transmitting means which is centrally mounted within the cup for transducing acoustical signals received from the mouth. The apparatus also includes a pair of acoustical transfer tubes which each have one end extending into the cup through a respective cup aperture. These transfer tubes are preferably resiliently and telescopingly extendable in length and extend from the cup into respective ear canals of the person wearing the apparatus for resiliently supporting the noise-shielding cup against the wearer's face, the tubes having tips which are shaped to fit closely into the ear canals for excluding ambient noise from the ears. The apparatus also includes a pair of signal receiving means mounted on the ends of respective tubes within the cup for transmitting acoustical signals through the tubes to the wearer's ears. The acoustical transfer tubes are connected to the noise-shielding cup at the cup apertures by means of flexible grommets and a leaf spring connected to the tube ends within the cup flexes the tubes within the grommets and resiliently biases the opposite tube ends toward each other so that the tips of the tubes are securely retained in the wearer's ear canals during movement of the wearer. Preferably additional spring means are connected between the leaf spring and the cup for orienting the open end of the cup against the wearer's face while the cup is supported against the wearer's face by the acoustical transfer tubes.

Other objects, advantages and details of construction of the improved communication apparatus of this invention appear in the following detailed description of preferred embodiments of the invention, the description referring to the drawing in which.

Figures 1, 4, 5:
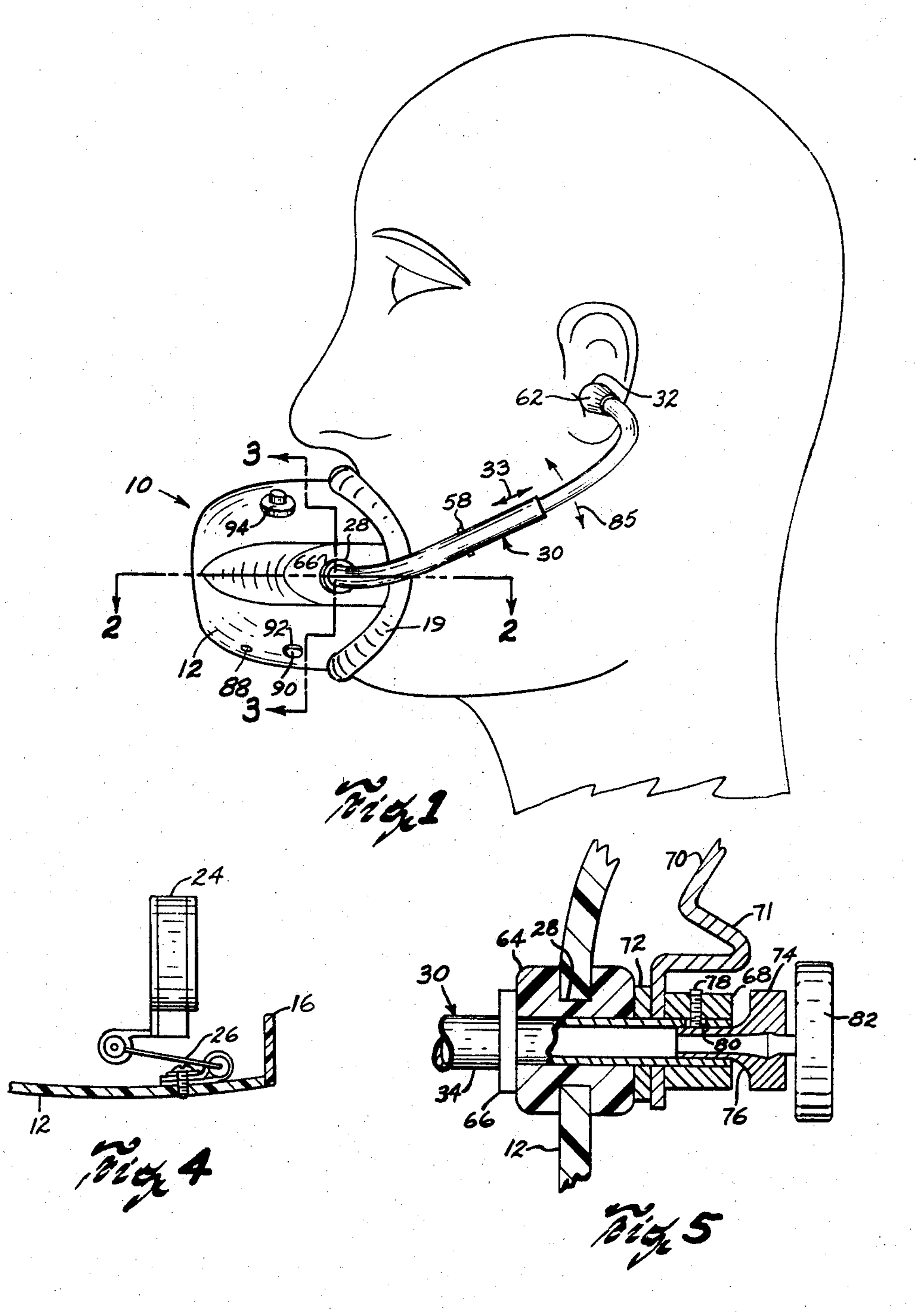
FIG. 1 is a side elevation view of the improved communications apparatus provided by this invention.
FIG. 4 is a partial section view along line 4—4 of FIG. 2.
FIG. 5 is a partial section view along line 5—5 of FIG. 3.
Figure 2:
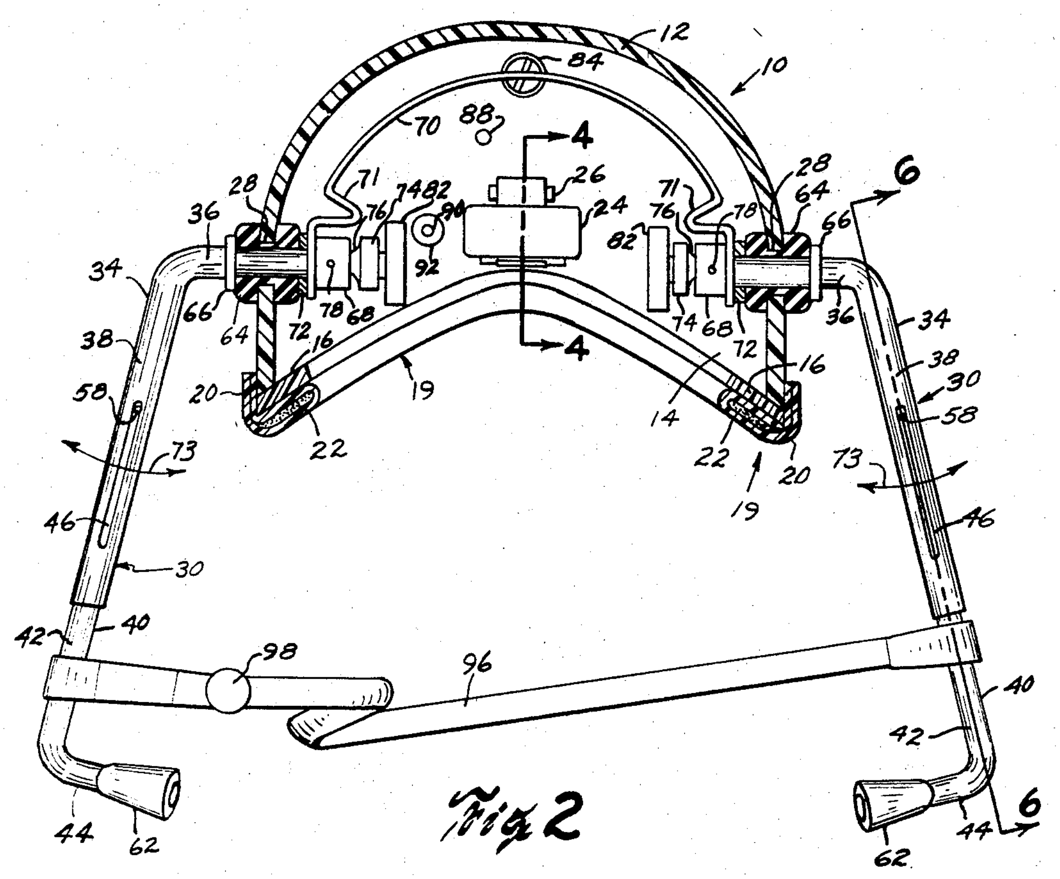
FIG. 2 is an enlarged section view along line 2—2 of FIG. 1.
Figure 3:
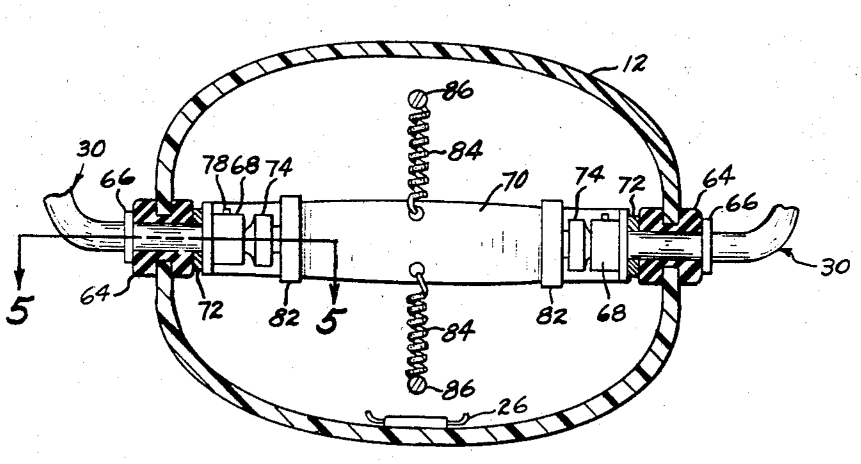
FIG. 3 is an enlarged section view along line 3—3 of FIG. 1.

Referring to the drawings, 10 in FIGS. 1–3 indicates the novel and improved communications apparatus provided by this invention which is shown to include a rigid noise-shielding cup 12 having an open end 14. The cup is preferably formed of molded polyoxymethylene or some other suitably light and rigid material and, if desired, may be provided with a flange 16 contoured to conform generally to the shape of the face 18 of a person wearing the communications apparatus as shown in FIGS. 1–3. A cushion 19 is disposed around the open cup end for conforming comfortably to the face to form an acoustical seal between the cup and face entirely around the mouth as illustrated. A preferred cushion 19 is formed of a strip of polyvinyl chloride 20 having folds heat-sealed together over a strip of polyurethane foam sponge 22, the folded edges of the strip being stretched over the cup flange as shown for securing the cushion on the cup. However, any other suitable cushion means for the cup is also within the scope of this invention.

A signal transmitting transducer means 24 such as a conventional microphone is mounted on the cup 12, preferably centrally of the cup, so that the person wearing the apparatus 10 can speak directly into the microphone in conventional manner. The microphone is preferably mounted by means of an adjustable support 26 (see FIG. 4) so that the best position for the microphone can be selected by the wearer but a fixed microphone mount is also within the scope of this invention.

In accordance with this invention, a pair of apertures 28 are located at opposite sides of the noise-shielding cup 12, preferably close to the open end of the cup, and a pair of acoustical transfer tube means 30 are attached to the cup and are arranged at one end to extend into the cup through respective cup apertures. These transfer tubes extend away from the cup at their opposite ends and are shaped to extend into respective ear canals 32 of a person wearing the apparatus 10.

Figure 6:
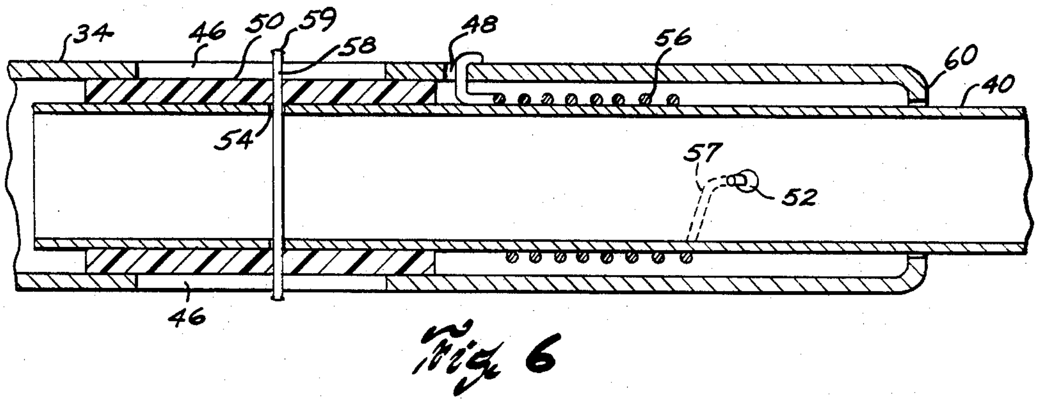
FIG. 6 is a partial section view along line 6—6 of FIG. 2.

In a preferred construction, the transfer tube means 30 are resiliently extendable as indicated by the arrow 33 in FIG. 1. For example, each of the tube means preferably embodies a first tube section 34 having two portions 36 and 38 disposed in angular relation to each other. A second tube section 40 of smaller diameter, also having two portions 42 and 44 angularly disposed relative to each other, is arranged to slide in telescoping relation into the first tube section. See FIG. 6. The first tube section 34 has a pair of axially extending slots 46 and has a hole 48 located near the slots. The second tube section 40 preferably has a plastic tube 50 fitted around a part of the tube section with a shrink fit and has a pair of holes 52 and 54 located in the tube section. A tension coil spring 56 is disposed within the tube section 34 around the tube section 40. This spring is connected to the first tube section 34 by means of the hole 48 and to the second tube section 40 by means of the hole 52. Preferably the spring has an L-shaped bend at each end as indicated at 57 in FIG. 6 to prevent spring distortion such as would make the spring bind against the tube sections 34 or 40. A pin 58 is driven through the plastic tube 50 and through the tube section hole 54, the ends of the pin extending into the slots 46 and being peened or enlarged as at 59 after assembly for retaining the pin as shown in FIG. 6. The end of the first tube section 34 is preferably turned inwardly as at 60 to enclose the spring 56 and a tip 62, preferably formed of a hard plastic material and shaped to fit closely within the ear canal 32, is cemented or otherwise fixed to the end of the tube section 40. The tube sections 34 and 40 are preferably formed of stainless steel or other stiffly resilient material of suitable strength. The tube 50 is preferably formed of a fluorocarbon material which is proportioned to fit snugly within the tube section 34 but which is adapted to slide freely within the tube section 34 due to the slippery nature of the surface of the selected plastic material. However, the tube 50 could also be formed of nylon or lubricious material within the scope of this invention.

In this construction of the acoustical transfer tube means 30, it can be seen that the tube tips 62 are adapted to fit closely into the ear canals 32, the tips serving to exclude ambient noise from the ears and the tube means being adapted to transmit acoustical signals through the tube means into the ear canals. The transfer tube means are resiliently and telescopingly extendable in length, the tube 50 serving as a bearing for facilitating sliding of the tube sections 34 and 40 and also serving to form an acoustical seal between the tube sections. The pin means 58 is tightly gripped by the plastic tube material and does not interfere with the acoustical seal provided by the tube 50. In addition, the pin 58 slides within the tube section slots 46 which retain the tube sections 34 and 40 in the same orientation relative to each other as the transfer tube means 30 is being extended. The pin 58 is also adapted to engage the ends of the slots 46 for limiting telescoping extension of the transfer tube means 30 as will be understood.

The tube section 34 of each transfer tube means 30 is preferably connected to the noise-shielding cup 12 by a flexible rubber grommet 64 or the like, and a washer 66 is preferably welded or otherwise secured to the tube section to rest against the grommet. See FIG. 4. In this arrangement, the tube means 30 are free to rotate within the grommets 64 and the flexible nature of the grommets permits the tube means 30 to swing toward and away from each other to at least a limited extent. The washer 66 limits sliding of the tube section 34 into the cup 12.

Within the noise-shielding cup 12, one end of the tube section 34 of each transfer tube means 30 fits into a bushing 68 which is welded or otherwise secured at one end of a curved leaf spring 70, the end of the leaf spring being arranged to rest against tthe grommet 64 or to be spaced from the grommet by a washer 72 as preferred. The leaf spring 70 preferably has reversely bent portions 71 as illustrated for permitting somewhat linear flexing of the spring. An earphone adapter bushing 74 has its neck portion 76 extending into the end of the tube section 34 and a set screw 78 threadedly engaged with the spring bushing 68 fits through a hole 80 in the tube section 34 to engage the adapter bushing for releasably locking the adapter bushing in the tube section 34. A signal receiving transducer means 82, preferably comprising an earphone of any conventional miniature type is mounted on each adapter bushing 74, preferably by means of a snap fit into the adapter bushing in conventional manner. As will be understood, the signal receiving means 82 is adapted to receive an electrical signal and to convert said signal to an acoustical signal which is then directed to the ear canal 32 through the acoustical transfer tube means 30.

In this arrangement, the leaf spring 70 connects the transfer tube means 30 at one end and limits the withdrawal of the transfer tube means from within the noise-shielding cup 12. The leaf spring normally urges the ends of the transfer tube means 30 apart within the cup 12 causing the tube means to flex the rubber grommets 64 and to resiliently bias the opposite ends of the tube means toward each other as indicated by the arrows 73 in FIG. 2.

In accordance with this invention, tension coil spring means 84 are attached at one end to the leaf spring 70 and at their opposite ends to the noise-shielding cup 12 as at 86. In this arrangement, the acoustical transfer tube means 30 are free to rotate in the rubber grommets 64 as indicated by the arrow 85 in FIG. 1 but are resiliently biased by the spring means 84 to extend from the noise-shielding cup 12 at a selected angle.

The noise-shielding cup 12 is preferably provided with any suitable vent means such as the vent hole 88. The cup is also provided with an aperture 90 fitted with a grommet 92 through which electrical leads (not shown) from the signal receiving and transmitting means 24 and 82 extend outside the cup 12 in conventional manner. If desired, control means 94 of any conventional type for the signal means 24 and 82 can also be mounted on the cup 12 as illustrated in FIG. 1. As the electrical connections and controls for the signal means 24 and 82 are completely conventional in the apparatus of this invention, no circuits or control means have been described herein. It will be understood that the signal means 24 and 82 can be operated in any conventional manner within the scope of this invention. For example, the signal receiving means 82 can comprise two earphones connected in parallel in the same circuit or can be connected in separate circuits for providing different acoustical signals to each ear as in sonar applications and the like. Controls for the signal means can be mounted on the apparatus 10 as indicated at 94 or, by use of conventional control arrangements, can be located remote from the apparatus 10.

It can be seen that the communications apparatus 10 is of simple, rugged, compact and inexpensive construction but that the apparatus is easily mounted on and removed from the head and is adapted for use in high noise environments. The apparatus is easily mounted on the head by moving the transfer tube means 30 apart and by fitting the tips 62 of the tube means in the ear canals 32, so that the apparatus is supported on the head by the transfer tube means and holds the noise-shielding cup 12 resting against the face. The tips 62 of the tube means seal ambient noise from the ear canals as previously noted. The transfer tube means are resiliently extendable in length and therefore fit comfortably into the ear of persons of any size. The bias exerted on the transfer tube means by the leaf spring 70 holds the tips 62 of the transfer means securely in the ear canals even during sharp and abrupt movements of the wearer. The resilient nature of the transfer tube extension urges the noise-shielding cup 12 firmly against the face of thte wearer 18 so that the cup cushion 19 forms an effective acoustical seal between the cup and face around the wearer's mouth. The spring means 84 permit the transfer tube means 30 to extend from the cup 12 at any angle in order to extend comfortably into the wearer's ears but at the same time assure that the cup is properly oriented with respect to the transfer tube means to hold the cup cushion 19 firmly against the wearer's face. Of course the noise-shielding cup 12 shields the signal receiving and transmitting means from ambient noise and the acoustical transfer tube means effectively transfer acoustical signals from the signal receiving means to the wearer's ears. The apparatus 10 is easily removed from the head merely by spreading the transfer tube means apart. As will be understood, mounting of the apparatus on the head or removal of the apparatus from the head is easily accomplished without interference from a helmet which may be worn by the person wearing the apparatus. If desired, a conventional strap 96 readily separable by a conventional releasable clasp such as a snap fastener 98 can be attached to the transfer tube means and passed loosely behind the wearer's head. When such a strap is worn, the wearer can remove the apparatus 10 from his head and can permit the apparatus to rest on his chest as supported by the strap 96. However if he wishes to completely remove the apparatus, this can be quickly accomplished by separating the strap at the clasp 98.

Figure 7:
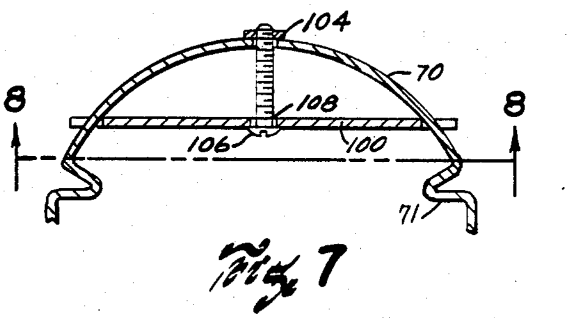
FIG. 7 is a partial view similar to FIG. 2 illustrating an alternative embodiment of the invention.
Figure 8:
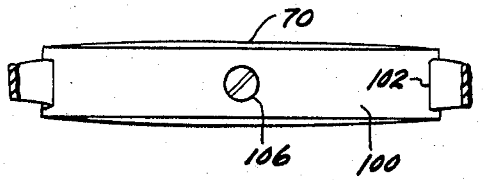
FIG. 8 is a section view along line 8—8 of FIG. 7.

In an alternate embodiment of the apparatus 10 illustrated in FIGS. 7 and 8, an additional leaf spring 100 provided wtih notches 102 at each end is arranged to engage the leaf spring 70 at two locations along the curved portion of the leaf spring 70. A nut 104 welded or otherwise fixed to the leaf spring 70 is then threadedly engaged by a screw 106 extending through a hole 108 in the leaf spring 100. As will be understood, the screw 106 can be adjusted to move the springs 70 and 100 closer together for increasing the force resiliently biasing the tips 62 of the transfer tube means 30 together or can be adjusted to move the springs 70 and 100 further apart for decreasing said force.

In other modifications of this invention, the earphones 82 need not be mounted within the noise-shielding cup 12 but, when of sufficiently small size, can be mounted within the tips 62 at the end of the tube means 30, the tube means 30 then serving to carry leads from the earphones to the cup 12 for exit through the grommet 90 as well as to support the apparatus as a whole.

It should be understood that the apparatus described herein has been described by way of illustration of the present invention and that this invention includes all modifications and equivalents thereof which fall within the scope of the appended claims.

I claim:

1. In a communications apparatus, the combination comprising signal transmitting means and signal receiving means all disposed within a noise-shielding cup, said cup being adapted to be fitted about the mouth and elongated hollow sound channelling means providing acoustical communication between said signal receiving means and the ears of a wearer when said apparatus is applied to the head with said cup fitted about the mouth and said sound channelling means entered into canals of the ears;

said cup having an open end adapted to conform to the configuration of the face about the mouth for shielding said signal transmitting and receiving means from ambient noise;

said sound channelling means including a pair of elongated open-ended tubular elements each having one of its ends extended through one of oppositely disposed sides of said cup and a hollow tip at its opposite terminal end adapted to fit closely into the canal of an ear;

said signal receiving means including an electrical signal-to-sound transducer disposed adjacent to each of said one ends of said sound channelling means within said cup; and said signal transmitting means comprising a microphone placed between said transducers within said cup.

2. The combination in communications apparatus according to claim 1 wherein each one of said pair of tubular elements is universally pivotable in said cup and comprises at least a pair of telescoped tubular components whereby overall lengths of said tubular elements from said cup and the spacing between terminal ends thereof may be adjusted to accommodate for various sizes and shapes of heads of prospective users of the apparatus.

3. The combination in communications apparatus according to claim 2 wherein a cushion extends around said open end of said cup for acoustically sealing the cup to the face around the mouth and means is provided for resiliently biasing said telescoped components of each of said tubular elements longitudinally toward one another for resiliently holding said cup in said sealed relationship with the face about the mouth when said terminal ends of said tubular elements are entered into the ear canals.

References Cited

UNITED STATES PATENTS

| | | | |
|---|---|---|---|
| 1,656,914 | 1/1928 | Hart | 179—156 X |
| 1,780,178 | 11/1930 | Dodge | 179—156 |
| 3,347,229 | 10/1967 | Heitman | 179—156 |
| 3,182,129 | 5/1965 | Clark et al. | |
| 3,180,333 | 4/1965 | Lewis | 179—156 |
| 2,939,923 | 6/1960 | Henderson | 179—182 |
| 2,780,681 | 2/1957 | Shaper | 179—156 |
| 2,535,063 | 12/1950 | Halstead. | |
| 2,405,543 | 8/1946 | Blomberg | 179—103 |

KATHLEEN H. CLAFFY, Primary Examiner

CHARLES JIRAUCH, Assistant Examiner

U.S. Cl. X.R.

179—156; 325—16